June 2, 1959     P. H. BOOKLUND     2,889,028
APPARATUS FOR ROTATING ARTICLES
Filed Feb. 19, 1957     2 Sheets-Sheet 1
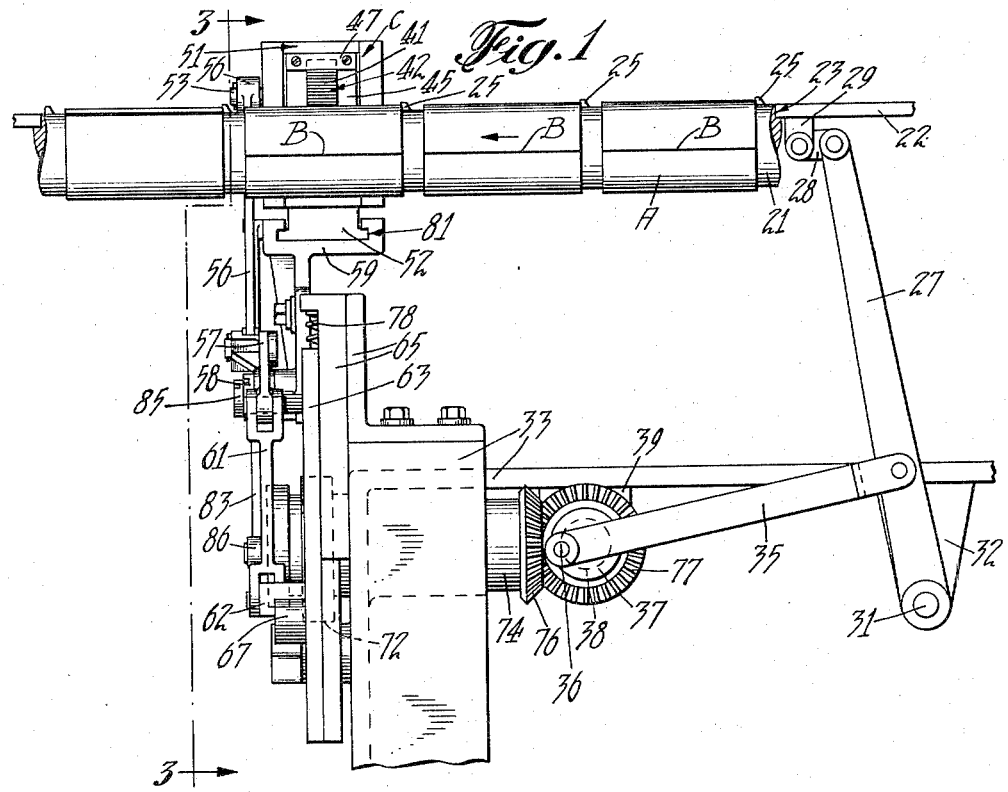
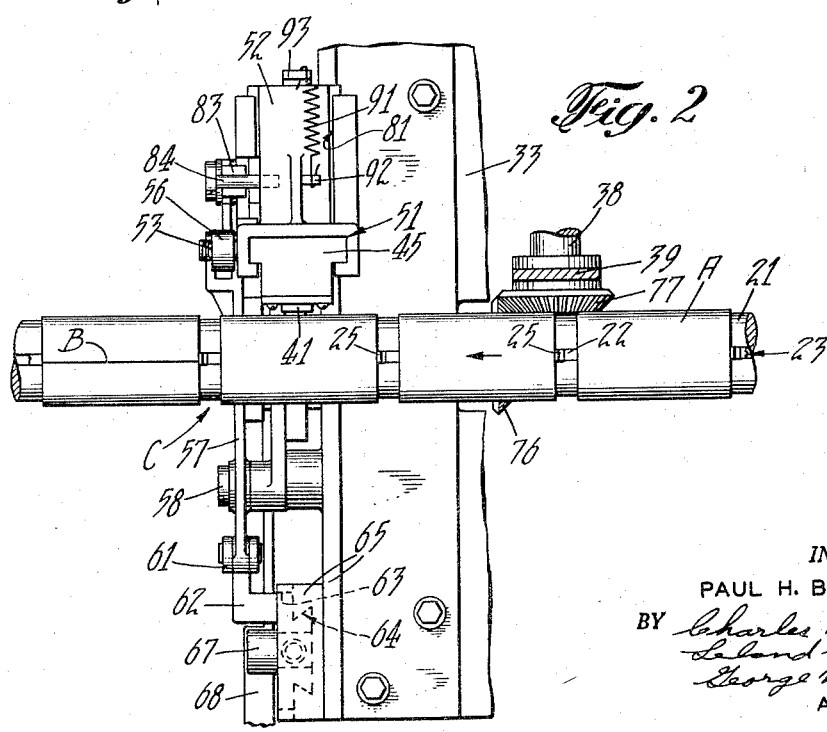
INVENTOR.
PAUL H. BOOKLUND
BY *Charles H. Lane*
*Leland R. McCann*
*George W. Reiber*
ATTORNEYS June 2, 1959 P. H. BOOKLUND 2,889,028
APPARATUS FOR ROTATING ARTICLES
Filed Feb. 19, 1957 2 Sheets-Sheet 2

INVENTOR.
PAUL H. BOOKLUND
BY Charles H. Erne
Leland R. McCann
George W. Raiber
ATTORNEYS

United States Patent Office

2,889,028
Patented June 2, 1959

2,889,028

APPARATUS FOR ROTATING ARTICLES

Paul H. Booklund, Joliet, Ill., assignor to American Can Company, New York, N.Y., a corporation of New Jersey Application February 19, 1957, Serial No. 641,172

7 Claims. (Cl. 198—33)

The present invention relates to an apparatus for treating cylindrical articles such as sheet metal or fibre can or container bodies and has particular reference to mechanism for rotating the articles on their axes a predetermined amount to arrange them in a predetermined position for subsequent treatment.

In the manufacture of cylindrical articles such as can or container bodies where a series of operations is required to complete the bodies, it sometimes happens that the bodies, upon completion of one operation, are not ideally positioned radially for a subsequent operation. In such an event the subsequent operation is greatly facilitated if the bodies are rotated on their axes into the desired position.

By way of example, it is common practice to make laminated fibre container bodies from rectangular blanks which are wrapped around a forming mandrel or horn in such a manner as to overlap marginal edge portions of the blank to produce a side seam. In some cases the bodies are left on the mandrel and advanced directly into a labelling station where paper labels are wrapped around the bodies. For certain kinds of labels, the main decorative panels of the labels when applied to the bodies are unavoidably superimposed over the side seams with the result that the panels are bulged out and present a displeasing appearance. This is the result of the side seams of the bodies, upon completion of the winding operation, being left unavoidably in an awkward position for the application of the labels to the bodies. The instant invention contemplates overcoming this difficulty by the rotation of the bodies on their axes to relocate their side seams in a more favorable position.

Another example is in the manufacture of sheet metal can or container bodies having side seams which after formation are left on the mandrel or horn in an awkward position for subsequent operations, such as soldering, coating, spraying, cooling or other operations.

An object, therefore, of the instant invention is the provision of an apparatus which rotates cylindrical articles on their axes through a predetermined distance equivalent to a predetermined circumferential distance on the outer surface of the articles so as to relocate a predetermined portion of the articles for a subsequent operation.

Another object is to effect the rotation of the articles through frictional engagement of the free outer surface of the articles at any convenient place on the articles.

Numerous other objects and advantages of the invention will be apparent as it is better understood from the following description, which, taken in connection with the accompanying drawings, discloses a preferred embodiment thereof.

Referring to the drawings:

Figure 1 is a side elevation of an apparatus embodying the instant invention, with parts broken away;

Fig. 2 is a top plan view of the apparatus shown in Fig. 1, with parts broken away;

Figure 3:
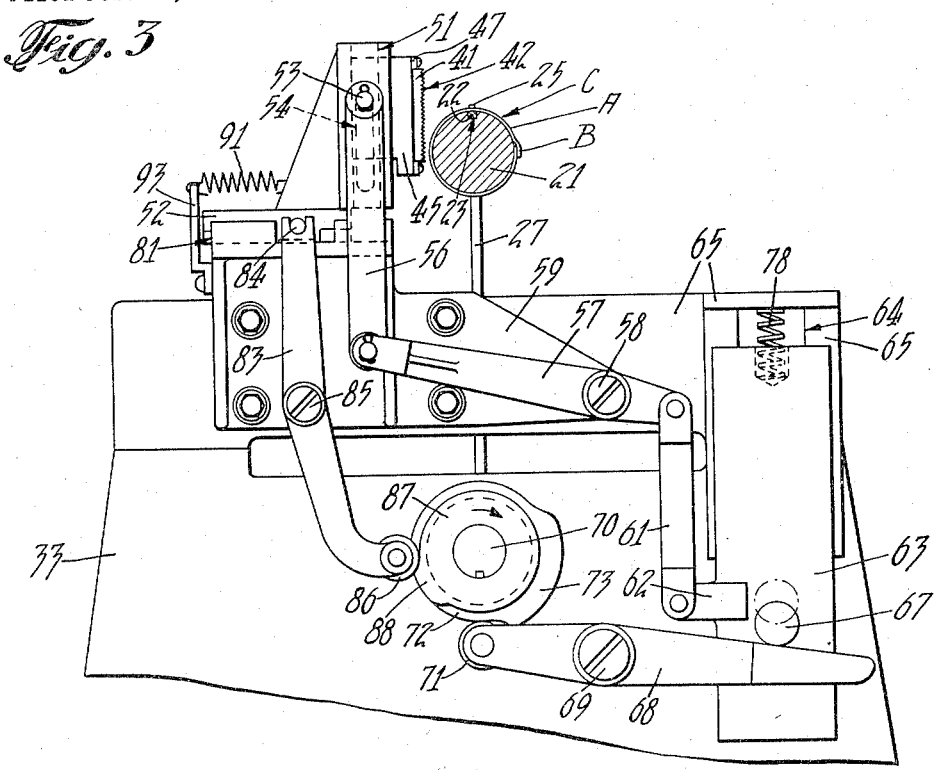
Fig. 3 is an end elevation taken substantially along a broken plane indicated by the lines 3—3 in Fig. 1, with parts broken away and parts in section.

As a preferred or exemplary embodiment of the instant invention, the drawings illustrate an apparatus for receiving in one position cylindrical, sheet material can bodies A having longitudinal side seams B, and for rotating the bodies A on their axes through a predetermined circumferential distance to relocate the side seams in a more favorable position for a subsequent operation on the bodies.

The can bodies A, preferably are supported on a horizontally disposed mandrel or horn 21 (Figs. 1, 2 and 3) upon which the bodies may be originally formed by wrapping blanks around the horn, or upon which the bodies are fed from a suitable source of supply. The horn 21 may be a part of a more elaborate machine such as a fibre body laminated winder or a sheet metal can body forming machine, both of which are well known in the can or container making art, the horn being supported in the frame of such a machine. The side seams B of the bodies are in longitudinal alignment in a predetermined position (as shown in Fig. 1 by way of example) as a result of a previous forming or advancing operation.

The can bodies A supported on the horn 21 are advanced along the horn intermittently, in spaced and timed, endwise processional order, by a reciprocable stroke or feed bar 22 disposed in a longitudinal groove 23 formed in the top of the horn 21. The feed bar 22 carries a plurality of spring-pressed feed dogs 25 for propelling engagement behind the trailing or rear edges of the bodies A on the horn. Reciprocation of the feed bar 22 preferably is effected by an upright actuating lever 27 (Figs. 1 and 3) which at its upper end is connected by a short link 28 to a lug 29 which depends from the feed bar. At its lower end, the lever 27 is mounted on a pivot pin 31 carried in a bracket 32 on a frame 33 which constitutes the frame of the can body rotating devices. Intermediate its length, the lever 27 is connected by a link 35 to a crank pin 36 on a disc 37 mounted on a rotatable shaft 38 which constitutes the main driving shaft of the apparatus. This drive shaft 38 is journaled in a bearing 39 on the frame 33 and is driven in any suitable manner.

Hence through the rotation of the drive shaft 38, the actuating lever 27 is rocked on its pivot pin 31 and the feed bar 22 is reciprocated through a can body feeding stroke, toward the left as viewed in Figs. 1 and 2 and thence through a return stroke toward the right. During each feeding stroke, at least one can body A is advanced into a turning station C.

Figure 4:
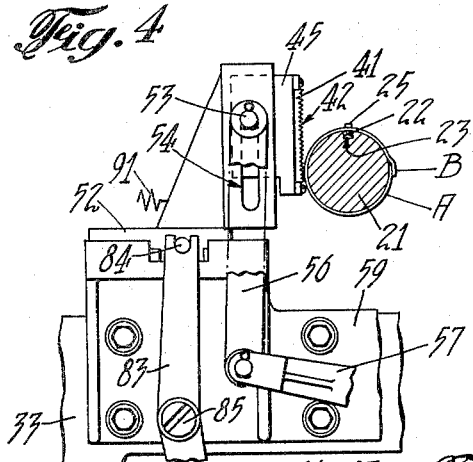
Figs. 4 and 5 are fragmentary sectional views similar to Fig. 3 showing certain of the parts in different positions.
Figure 5:
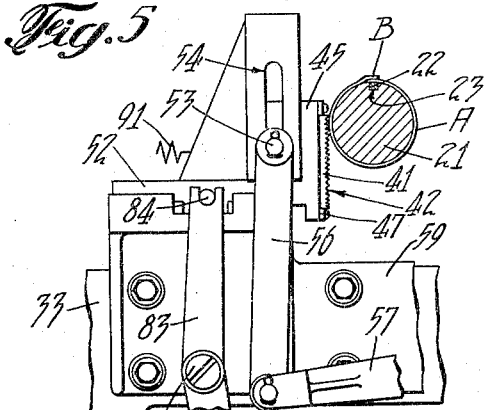

At the turning station C, the received can body A preferably while at rest is rotated on its axis while supported on the horn 21, to relocate the side seam, as for example from the position shown in Fig. 4 to the position shown in Fig. 5, to facilitate the carrying out of a subsequent operation on the seam or on the body. This rotation of the can body A is effected by a flat faced, elongated, vertically disposed friction member 41 which is located adjacent the horn 21 in a retracted position alongside the path of travel of the can bodies on the horn and is actuated through a parallelogram movement to engage and rotate the body as will be hereinafter more fully explained.

Figures 6, 7:
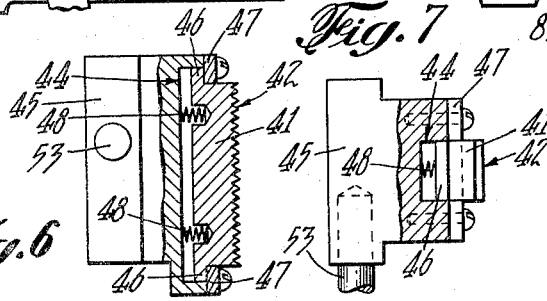
Fig. 6 is an enlarged side elevation of a detail shown at the top in Fig. 3, with portions broken away and shown in section.
Fig. 7 is a top plan view of the detail shown in Fig. 6 with portions broken away and shown in section.

The friction member 41 preferably is rectangular in form and is provided on its flat face with serrations 42 to frictionally engage against the outer curved surface of the can bodies A (see Figs. 6 and 7). This friction member 41 is yieldably held in a recess 44 formed in the vertical face of an actuating slide 45, the upper and lower ends of the friction member having retaining lugs 46 normally engaging against stop bars 47 secured to the vertical face of the actuating slide 45. Compression springs 48 interposed between the back of the friction member 41 in the recess 44 and the slide 45 hold the friction member in this normal position and provide the yieldable feature of the member.

The actuating slide 45 is mounted for vertical movement in a vertical slideway 51 (Figs. 1 and 2) formed in a vertical face of a horizontally movable auxiliary slide 52. For this purpose the actuating slide 45 carries a laterally extending actuating pin 53 (all figures) which projects through a vertical slot 54 (Figs. 3, 4 and 5) in the auxiliary slide 52. The outer end of the actuating pin 53 is pivotally connected by a depending link 56 (Fig. 3) to one end of a rocker arm 57 which intermediate its length is mounted on a pivot stud 58 secured in a bracket 59 on the frame 33. The opposite end of the rocker arm 57 is pivotally connected by a depending link 61 to a lug 62 on a vertically movable wiper slide 63 (see also Figs. 1 and 2) operating in a vertical dovetail slideway 64 in a bracket 65 on the frame 33.

The wiper slide 63 carries a wiper pin 67 which has wiping engagement with a free wiper end of a cam lever 68 (Fig. 3) mounted intermediate its length on a pivot stud 69 secured into the frame 33. At its opposite end the cam lever 68 carries a cam roller 71 which engages against an edge cam 72 having a cam high spot 73 disposed in a predetermined location. The edge cam 72 is carried on a cam shaft 70 journaled in a bearing 74 (Fig. 1) formed in the frame 33. This shaft 70 is rotated continuously in time with the reciprocation of the feed bar 22, through a bevel gear 76 mounted on the shaft 70 and meshing with a bevel gear 77 on the main drive shaft 38. A compression spring 78 (Figs. 1 and 3) interposed between the top of the wiper slide 63 and the top of the slide bracket 65 normally depresses the wiper slide 63 and thus holds the wiper pin 67 against the cam arm 68 and also holds the cam roller 71 against the cam 72.

Through this train of links and arms, the edge cam 72 through its high spot 73, reciprocates the actuating slide 45 and the friction member 41 attached thereto, through a downward or can body turning stroke and thence upward through an idle return stroke at the proper time. This vertical movement of the friction member 41 is brought about in time with a horizontal movement toward and away from the can body on the horn 21, to produce a parallelogram movement in which the auxiliary slide 52 produces the horizontal component and the actuating slide 45 produces the vertical component. To effect this parallelogram movement the slides 45, 52 are mounted one upon the other and operate in synchronism.

The auxiliary slide 52 is mounted in a horizontal slideway 81 (Figs. 1, 2 and 3) formed in the bracket 59 and extending at right angles to the horn 21 on which the can bodies A are supported. Reciprocation of the slide 52 toward and away from the horn preferably is effected by an upright cam arm 83, the upper end of which is bifurcated and straddles an actuating pin 84 which projects laterally from the slide. Intermediate its length the cam arm 83 is mounted on a pivot stud 85 threadedly secured in the frame 33. At its lower end, the cam arm 83 carries a cam roller 86 which engages against an edge cam 87 having a cam high spot 88 (Fig. 3). The cam 87 is mounted on the cam shaft 70, adjacent the edge cam 72, with the high spots 73, 88 of the two cams 72, 87 in timed relation. A tension spring 91, stretched between a pin 92 on the auxiliary slide and a lug 93 on the bracket 59, serves to hold the cam roller 86 against the edge cam 87.

Hence as the cam shaft 70 rotates through one revolution for each cycle of operation, i.e. for each can body A advanced into the turning station C, the high spot 88 on the edge cam 87 engages the cam roller 86 and thus rocks the cam lever 83 to shift the auxiliary slide 52 toward the horn 21 (toward the right in Fig. 3). This moves the friction member 41 horizontally from the position shown in Fig. 3, into frictional tangential engagement against the outer curved surface of the can body A at the station, the contact being made adjacent the lower end of the friction member as shown in Fig. 4, since the member at this time is disposed in its normal position relative to its actuating slides 45, 52.

As soon as the friction member 41 engages the can body, the high spot 73 on the edge cam 72 engages the cam roller 71 on the wiper cam arm 68 and rocks the arm to lift the wiper slide 63 and thereby pull the friction member 41 down to the position shown in Fig. 5, through a stroke of a predetermined length dependent upon the rise of the cam high spot 73. This downward stroke of the friction member 41 rotates the can body A on its axis on the horn 21 and thus shifts the can body side seam B, for example, from the position shown in Figs. 3 and 4 to the position shown in Fig. 5. The circumferential distance the seam B travels during this rotation of the body is equivalent to the length of the down stroke of the friction member 41.

By changing the rise of the edge cam 72 or pivot points 58, 69 of the cam levers 57, 68 the stroke of the friction member 41 may be shortened or lengthened to effect a corresponding change in the equivalent circumferential distance travelled by the body seam B. Thus the side seams B of can bodies A received in one predetermined position are readily relocated into another desired predetermined position by a rotation of the can bodies on their axes through an angle depending upon the circumferential travel of the seams as measured on the outer surface of the can bodies at their point of contact with the friction member 41.

At the completion of the down or body rotating stroke of the friction member 41, the latter is withdrawn from its engagement with the rotated can body to leave the seam B in its newly relocated position. This is effected through a return movement of the auxiliary slide 52, which now shifts toward the left as viewed in Fig. 5 and thereby moves the friction member away from and clear of the body. This movement of the auxiliary slide 52 is brought about by the rocking of the rocker arm 83 when the cam roller 86 rides off the high spot 88 of the edge cam 87.

When hte friction member 41 is fully clear of the rotated can body A, the cam roller 71 of the wiper cam arm 68 rides off the high spot 73 of the edge cam 72 and this, through the force of the compression spring 78 and the linkage connecting the cam arm 68 with the friction member actuating slide 45, raises the friction member 41 and thereby returns the latter to its original or normal position as shown in Fig. 3 for a repeat operation upon the next can body A advanced into the turning station. This completes the parallelogram movement of the friction member 41.

The rotated can body A with its newly located side seam B is moved out of the turning station C as shown in Fig. 1 upon the next feeding stroke of the feed bars 22 which advance the next body in the procession into position in the body turning station C for rotation.

It is thought that the invention and many of its attendant advantages will be understood from the foregoing description, and it will be apparent that various charges may be made in the form, construction and arrangement of the parts without departing from the spirit and scope of the invention or sacrificing all of its material advantages, the form hereinbefore described being merely a preferred embodiment thereof.

I claim:

1. An apparatus for rotating a cylindrical article on its axis a predetermined amount, comprising a support for the article, a friction member disposed adjacent said support for frictional engagement with the outer surface of said article, and cam actuated means for moving said friction member in engagement with said article a predetermined distance equivalent to a predetermined circumferential distance on the engaged outer surface of said article to rotate said article from its received position into a predetermined position for subsequent treatment.

2. An apparatus of the character defined in claim 1 wherein said friction member is an elongated reciprocable member.

3. An apparatus of the character defined in claim 1 wherein said friction member is provided with a rigid flat friction face for tangential engagement with the outer curved surface of said article.

4. An apparatus of the character defined in claim 1 wherein said friction member is yieldably spring pressed against said cylindrical article and is provided with an elongated serrated face for frictional engagement with the outer surface of said article.

5. An apparatus of the character defined in claim 1 wherein there is provided an auxiliary actuating device for shifting said friction member into and out of engagement with said article.

6. An apparatus of the character defined in claim 5 wherein said auxiliary actuating device is a slide mounted adjacent the article support and said actuating means is a slide mounted on said first mentioned slide, and wherein there is provided means for shifting said slides relative to each other and relative to said article to effect the rotation of said article.

7. An apparatus of the character defined in claim 1 wherein said actuating means includes means for moving said friction member along a parallelogram path of travel for shifting said member into engagement with the article, for rotating the article, for shifting said member away from the rotated article, and for returning said member to its original position for a repeat operation on a subsequent article.

References Cited in the file of this patent

UNITED STATES PATENTS

| | | |
|---|---|---|
| 2,069,872 | Burns | Feb. 9, 1937 |
| 2,788,113 | Waal | Apr. 9, 1957 |